June 15, 1937.  A. FERRARI ET AL  2,084,248
VALVE
Filed Sept. 11, 1935

Abele Ferrari
Cesare Rafanelli
Mario Scalione
Inventors

By C. A. Snow & Co.
Attorneys

Patented June 15, 1937

2,084,248

UNITED STATES PATENT OFFICE 2,084,248

VALVE

Abele Ferrari, Cesare Rafanelli, and Mario Scalione, Healdsburg, Calif.

Application September 11, 1935, Serial No. 40,136

2 Claims. (Cl. 277—59)

This invention relates to a valve and while it is designed primarily for use in connection with wine pumps, it is to be understood that the same may be utilized for other purposes where it is desired to use a valve which can be easily cleaned and which will operate efficiently to open or shut the ports leading thereto.

It is a further object of the invention to provide the valve with automatically adjustable cut off elements so shaped as to fit tightly against the surfaces cooperating therewith and to automatically compensate for wear.

A still further object is to provide a valve especially adapted for use in controlling the flow of liquids containing more or less solid substances (as, for example, wines) which tend to clog any internal protrusions and to render valves of ordinary construction inefficient.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1:
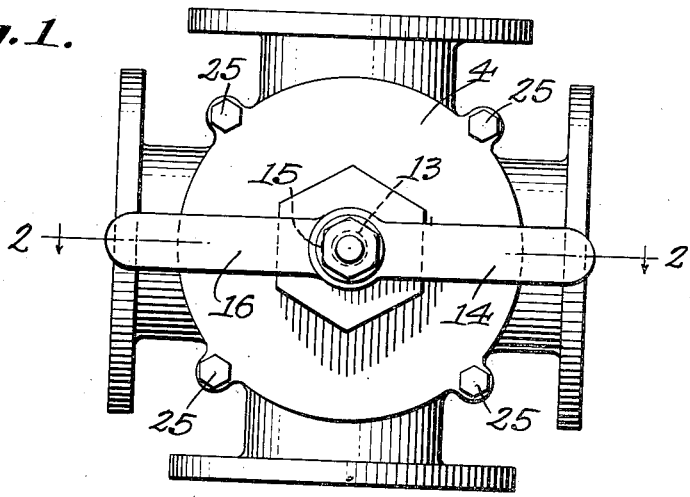
Figure 1 is a plan view of a four-way valve having the present improvements combined therewith.
Figure 3:
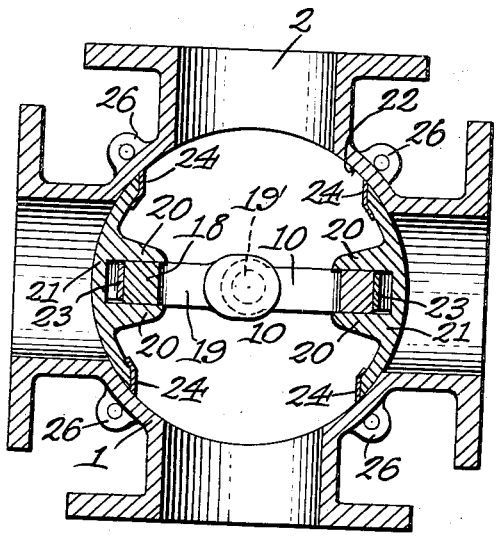
Figure 3 is a section on line 3—3 Figure 2.

Referring to the figures by characters of reference, 1 designates a valve casing which, in the present instance, is provided with four equally spaced radial ports indicated at 2, although it is to be understood that the number of these ports can be reduced if desired.

The valve casing is provided with heads 3 and 4, the head 3 being formed with a central socket 5 while the head 4 has a central opening 6 which can be surrounded by a packing gland 7 or the like.

Mounted for rotation within the socket 5 is a trunnion 8 having a recess 9 extending thereinto and this trunnion is located at one end of an arm 10 located at one end of a bar 11 which extends from head 3 to head 4. Another arm 12 is provided at the other end of this bar 11 and has a stem 13 which extends through the opening 6 and is provided at its outer end with an operating handle 14 joined thereto in any suitable manner.

Rotatable within the opening 6 and upon the stem 13 is a tubular stem 15 to the outer end of which is connected a handle 16 while the inner end thereof extends partly across the end of arm 12 and is made integral with an arm 17 extending from one end of a bar 18. This bar is similar to the bar 11 and extends from head 4 to head 3. That end of the bar 18 remote from arm 17 has an arm 19 carrying a trunnion 19′ which is mounted for rotation in the socket 5 in the trunnion 8.

Figure 2:
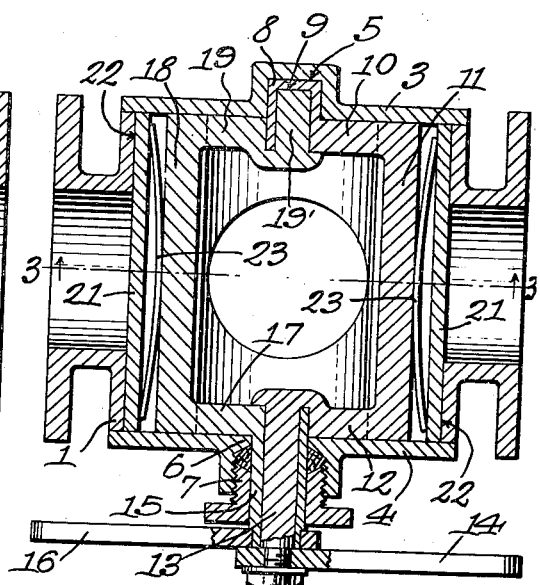
Figure 2 is a section on line 2—2 Figure 1.

Each of the bars 11 and 18 is seated in a channel formed by parallel ribs 20 extending from an arcuate guard plate 21 the outer surface of which corresponds with the curvature of the cylindrical inner surface 22 of valve casing 1. Springs 23 are interposed between these plates 21 and the bars to which they are joined and these springs, which preferably are bowed as shown in Figure 2, operate to hold the arcuate outer faces of the valve plates 21 pressed firmly against the inner surface 22 of the valve casing. The ends of the channels formed by ribs 20 are closed by the heads 3 and 4 and the ends of the bars 11 and 18 bear against these heads. Therefore pulp and other foreign substances are kept out of the spaces in the channels and will not interfere with the relative movement of the parts.

The longitudinal edges of the plates 21 can be beveled as shown at 24 and to these edges can be secured scraping or cutting blades 24 of stainless steel or other hard non-corrosive material which act to cut through stems, skins or other solid substances with which they may come into contact at the ports, thereby preventing the valve from becoming clogged. These blades can be secured to the valve members 21 in any manner desired.

It will be apparent that by providing two valve plates 21 with the respective stems 13 and 15, the said plates can be operated independently or simultaneously for the purpose of controlling the flow of fluid through one or more of the ports. At all times these blades are maintained in intimate contact with the inner surface 22 of casing 1 so that leakage will be prevented. At the same time the cutting blades provided on the plates will enable said plates to be operated in spite of any accumulations of solid substances which might be located at the ports and in the paths of the plates.

By removing one or both of the heads 3 and 4 the internal mechanism of the valve can be removed easily for the purpose of cleaning or repairing them, it being understood that these heads are held detachably in place by any suitable means provided for that purpose such as bolts 25 seated in projecting ears 26 on the heads and casing.

What is claimed is:

1. A valve of the class described including a casing having ports opposed heads, and a cylindrical inner surface, bars mounted to move within a circle in the casing and having wiping contact at its ends with the heads, valve plates carried by and slidable on the respective bars, said plates bearing at their ends against the heads and each having an arcuate outer surface corresponding in curvature with the cylindrical inner surface of the casing, there being a channel in each plate closed at the ends by the heads and between its ends by the bar, means interposed between the bar and plate for maintaining said outer surface of the plate in intimate contact with the inner surface of the casing, and separate means for independently moving the respective plates in the same direction or toward or from each other along the cylindrical inner surface to open or close predetermined ports, either of said plates being movable against the other to shift it or to close the space between the plates.

2. A valve including a casing having opposed heads, a cylindrical inner surface, and a plurality of ports, plates each having an outer surface the curvature of which conforms with the cylindrical curvature of the inner surface of the casing, there being a channel extending longitudinally of the plate and closed at its ends by the heads, a bar within the casing mounted for movement in a circle, said bar extending into the channel and closing it between its ends, a spring interposed between the bar and plate for maintaining said plate in yielding contact with the cylindrical surface of the casing and separate means for moving the respective plates in the same direction or toward or from each other along said cylindrical surface of the casing to open or close selected ports and the space between the plates.

ABELE FERRARI.
CESARE RAFANELLI.
MARIO SCALIONE.